United States Patent
Eguchi et al.

(10) Patent No.: US 6,761,659 B2
(45) Date of Patent: Jul. 13, 2004

(54) METHOD FOR CONTROLLING ENGAGEMENT OF FRICTIONALLY ENGAGING ELEMENT IN POWER TRANSMISSION

(75) Inventors: Takahiro Eguchi, Wako (JP); Masaaki Yamaguchi, Wako (JP); Ukyo Ogata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/303,208

(22) Filed: Nov. 25, 2002

(65) Prior Publication Data

US 2003/0109360 A1 Jun. 12, 2003

(30) Foreign Application Priority Data

Dec. 10, 2001 (JP) .......................... 2001-375644

(51) Int. Cl.$^7$ ............................................. B60K 41/02
(52) U.S. Cl. .................... 475/174; 192/103 R; 701/67; 475/175
(58) Field of Search ............................. 477/174, 175; 701/67; 192/103 R, 111 A

(56) References Cited

U.S. PATENT DOCUMENTS

| | | | | |
|---|---|---|---|---|
| 4,899,858 A | * | 2/1990 | Cote et al. ................. | 701/67 |
| 5,082,096 A | * | 1/1992 | Yamashita et al. ......... | 477/175 |
| 5,377,874 A | * | 1/1995 | Brown .................... | 192/103 R |
| 5,411,124 A | * | 5/1995 | Olson ..................... | 192/103 R |
| 6,086,514 A | * | 7/2000 | Jones et al. ................ | 477/180 |
| 6,344,016 B1 | * | 2/2002 | Eguchi ..................... | 477/175 |
| 6,494,810 B1 | * | 12/2002 | Mack et al. ............... | 477/174 |
| 2002/0183912 A1 | * | 12/2002 | Inoue et al. ............... | 701/67 |

FOREIGN PATENT DOCUMENTS

EP 0320261 * 12/1988 ........... B60K/41/02

* cited by examiner

Primary Examiner—Charles A Marmor
Assistant Examiner—Eric M. Williams
(74) Attorney, Agent, or Firm—Fish & Richardson P.C.

(57) ABSTRACT

In a power transmission, which adjusts and transmits the rotational output of an engine by the engagement control of a starting clutch 5, the rotational speed Ne and the suction negative pressure Pb of the engine are measured while the starting clutch is being actuated from a disengaged condition to an engaged condition with the engine being operated under a constant operational condition. An engagement-control value is calculated for the starting clutch when there is a change in the rotational speed and the suction negative pressure being measured, and the engagement-control value calculated is stored as an initial control value for starting an engaging action of the starting clutch. This initial control value is used for controlling the engagement of the starting clutch.

6 Claims, 7 Drawing Sheets

METHOD FOR CONTROLLING ENGAGEMENT OF FRICTIONALLY ENGAGING ELEMENT IN POWER TRANSMISSION

RELATED APPLICATIONS

This application claims the priority of Japanese Patent Application No. 2001-375644 filed on Dec. 10, 2001 which is incorporated herein by reference.

FIELD OF THE INVENTION

The present invention relates to a method for controlling the engagement of frictionally engaging elements provided in a power transmission, through which engagement control, the rotational output of an engine is transmitted to wheels with some adjustment.

BACKGROUND OF THE INVENTION

Generally, an automobile includes a construction that transmits the driving force of an engine through a power transmission to wheels for driving the vehicle body, and for controlling this power transmission, a plurality of frictionally engaging elements such as friction clutches are typically incorporated in the transmission. For optimizing the engagement characteristic of the friction clutches in engagement control, it is important to monitor accurately the engagement control value at the time of the initiation of engagement action. Generally, the power transmissions used in an automobile is equipped with hydraulically actuated friction clutches. In this case, hydraulic actuation pressures are evacuated from the clutches completely for disengagement. Therefore, when any friction clutch is to be engaged, the friction clutch must be at first cleared of the ineffective or invalid part of the stroke of the clutch piston before an actual engagement of the clutch starts. This arrangement of the hydraulic clutch has an inherent problem of experiencing a delay prior to the actual engaging actuation. To solve this problem, it is important to determine the pressure that initiates the real engaging action of the friction clutch in engagement control or the pressure that completes the clearing of the ineffective part of the stroke of the clutch and sets the clutch into pre-engagement condition, and to utilize this determined engagement-control pressure for controlling the engagement actuation of the friction clutches.

Especially in a case where a friction clutch is used as a starting clutch in a vehicle, if the starting clutch, which has been relieved of the pressure used for an engagement actuation, is supplied again with oil to generate the pressure necessary for controlling the starting of the vehicle, there is a delay before the actual engaging action of the clutch occurs. When the pressure in the clutch increases, the part of the stroke of the piston which does not contribute to the real engagement of the clutch is cleared (hereinafter referred to as "invalid stroke clearing"). After the completion of the invalid stroke clearing, when the starting clutch begins an actual engaging action, the pressure actuating the engaging action may become substantially large and make the clutch to engage abruptly, causing a problem of startup shock. If such an abrupt engagement occurs in the starting clutch, then the load on the engine will increase suddenly and may cause an engine stall.

Furthermore, for the purpose of improving fuel economy and reducing air pollution, many vehicles nowadays are equipped with an idling elimination control, in which the operation of the engine is stopped when the vehicle comes into a halt. In such a vehicle, when the vehicle starts, the engine must be started with the starting clutch being controlled to engage appropriately. Therefore, it is important to determine the pressure that sets the starting clutch into a pre-engagement condition, i.e., a condition where the starting clutch can start a real engaging action.

On this background, a control that learns and sets an optimal pressure for a frictionally engaging element such as a starting clutch has been developed and set in practice to achieve the above mentioned pre-engagement condition or an engagement-starting condition. For example, there is a method for learning the pressure at which the starting clutch begins the real engaging action by detecting a change in the load on the engine experienced when the transmission is shifted from a neutral position (N range) to a drive position (for example, D range) from a change in the negative pressure of the suction of the engine. Furthermore, in a vehicle whose fuel supply to the engine is controlled to stop while the vehicle is in deceleration, another method is applied for learning the pressure at which the starting clutch begins the real engaging action. This method is based on the fact that, in this vehicle, while the fuel supply is stopped during the deceleration, the slip factor of the clutch is controlled such that the torque-transmission capacity of the clutch calculated from the engagement-control pressure of the clutch equals the friction torque of the engine.

However, in a case where the pressure at which the starting clutch begins the real engaging action is determined based on the detection of a load change during a shift from the N range to the D range, there is a problem that if the rotational speed of the engine changes during the determination, then the determination cannot be performed accurately. This limitation, i.e., the determination must be carried out while the rotational speed of the engine is kept constant, makes the determination of the engagement-control pressure difficult to perform. While the fluctuation of the engine rotational speed is minimized, the engagement-control pressure of the clutch is changed slightly, and the transmission is switched between the drive ranges. By repeating the switching of the drive ranges, optimal pressure values are measured. However, the measurement performed in this way takes a relatively long period of time (for example, a few minutes). If the measurement takes a longer period of time, then it is more difficult to prevent a fluctuation in the rotational speed of the engine.

In a case where the pressure at which the starting clutch begins the real engaging action is measured on the basis of the engagement-control pressure of the clutch, whose slip factor is controlled while the vehicle is in deceleration with the termination of the fuel supply to the engine, it is necessary to decelerate the vehicle for the measurement to be performed. Therefore, the measurement in this case is a large scale operation and takes a long period of time.

As mentioned above, for a vehicle which is controlled to eliminate engine idling, it is important to determine the engagement-control pressure that sets the clutch into a real engaging action in the engagement control of the clutch at the starting of the vehicle. In this case, unless the vehicle is actually driven for the control system to learn the engagement-control pressure, the system sets the vehicle not to perform an idling elimination control. Therefore, before the vehicle is shipped out of a factory, the engagement-control pressure at which the clutch begins the real engaging action should be measured and determined by a test on a bench using the above mentioned method. However, this measurement operation takes a long period of time and is difficult to perform accurately as mentioned above. As a result, this operation increases the manufacturing cost of the vehicle. As there is a choice that such setting operation is not performed at the shipping of the vehicle, if it is not performed at the factory, then the idling elimination control of the vehicle is not performed until the engagement-control pressure is learned and set appropriately in real driving situations. This condition affects adversely the fuel economy of the vehicle and may cause the driver or owner to feel something wrong with the vehicle.

SUMMARY OF THE INVENTION

It is an object of the present invention to provide a method for measuring simply and quickly an engagement-control value when the frictionally engaging element (friction clutch) begins an engaging action or when it is set into a pre-engagement condition where it can start immediately an engaging action.

To achieve this objective, the present invention provides a method for controlling the engagement of a frictionally engaging element (for example, the starting clutch 5 described in the following embodiment) in a power transmission (for example, the continuously variable transmission CVT described in the following embodiment), through which engagement control, the rotational output of an engine is adjusted and transmitted to drive wheels. In this method, at least either the rotational speed of the engine or a parameter which corresponds to the rotational speed of the engine is measured while the frictionally engaging element is being actuated from a disengaged condition to an engaged condition, with the engine being operated under a constant operational condition. When there is a change in at least any of the rotational speed of the engine and the parameter being measured, an engagement-control value is calculated for the frictionally engaging element, and the engagement-control value calculated is stored as an initial control value used for starting the engagement of the frictionally engaging element, so that the initial control value is used to control the next engagement session of the frictionally engaging element.

By this method, while the operational condition of the engine is kept constant, only the engaging condition of the frictionally engaging element is changed to measure the initial control value at which the engaging action of the frictionally engaging element starts. This measurement can be performed simply and quickly (in about 10 seconds), so it can be performed simply, for example, at the end of a manufacturing line before the vehicle is shipped from a factory, without complicating a pre-shipment inspection. If the initial control value is set by this measurement in pre-shipment condition in this way, then the vehicle equipped with an idling elimination control can perform the idling elimination control without any problem immediately after the delivery of the vehicle. Therefore, the method according to the present invention can improve the product value of the vehicle.

The initial control value set in this way is used for the engagement control of the frictionally engaging element when the power transmission is operated for the first time. Thereafter, the engagement-control value at which the frictionally engaging element begins an engaging action is calculated from the engagement characteristic determined from the condition of the frictionally engaging element being controlled to engage in real driving situations. Preferably, the engagement-control value is calculated and used to renew the initial control value in memory, continu-ally. In this way, the engagement control can be performed appropriately and accurately in correspondence to the real driving situation even if the frictionally engaging element undergoes deterioration with age.

In this method, the above mentioned parameter may be the suction negative pressure of the engine, and when the suction negative pressure changes to a higher load side and when the rotational speed of the engine decreases, the engagement-control value for the frictionally engaging element is stored as the initial control value.

On the other hand, although the suction negative pressure of the engine changes to a higher load side, if the rotational speed of the engine increases or does not change, then this condition is judged as a case of wrong learning, so the engagement-control value for the frictionally engaging element in this case is not stored as the initial control value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
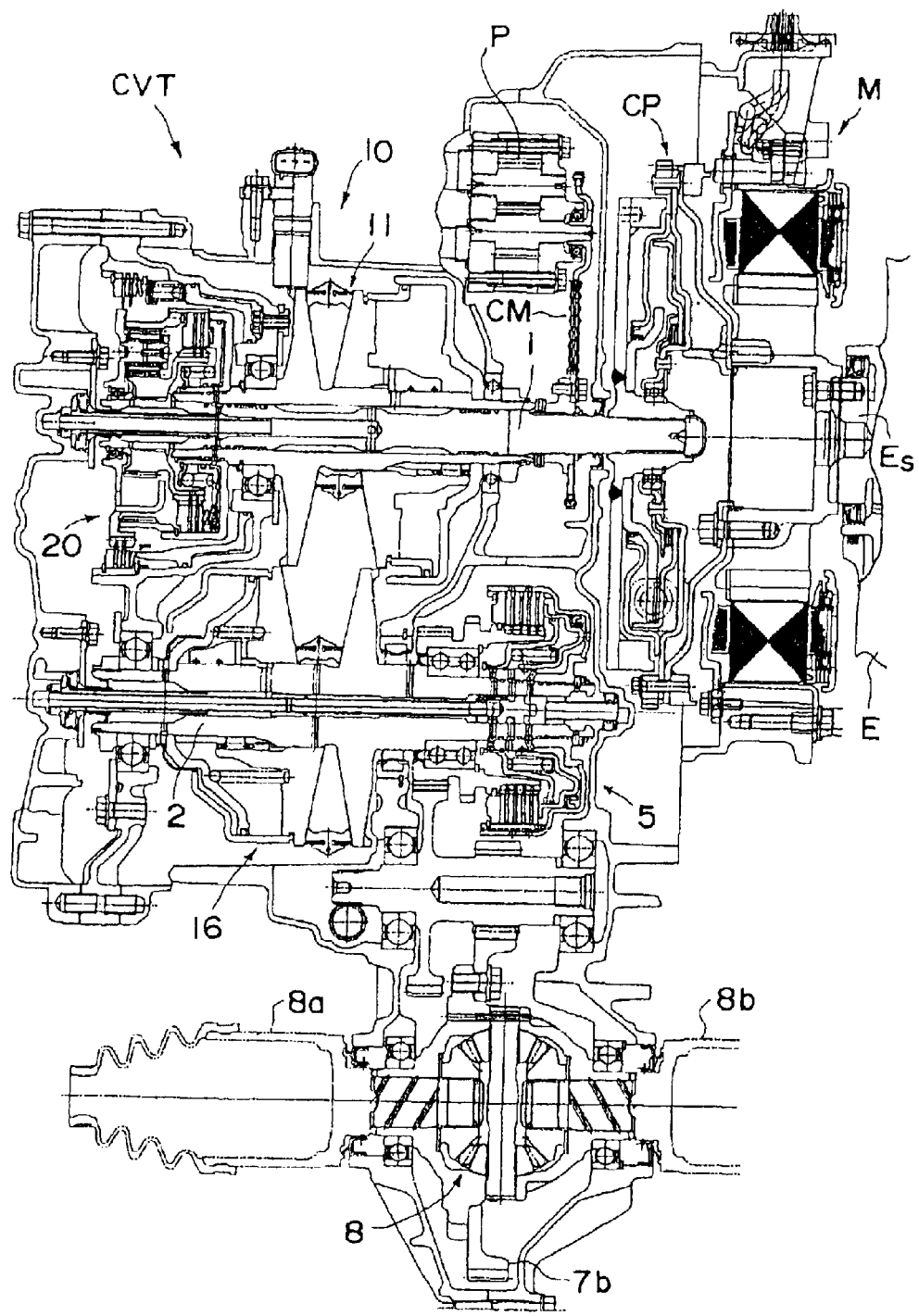
FIG. 1 is a sectional view describing the construction of a power transmission, to which a control method according to the present invention is applied.
Figure 2:
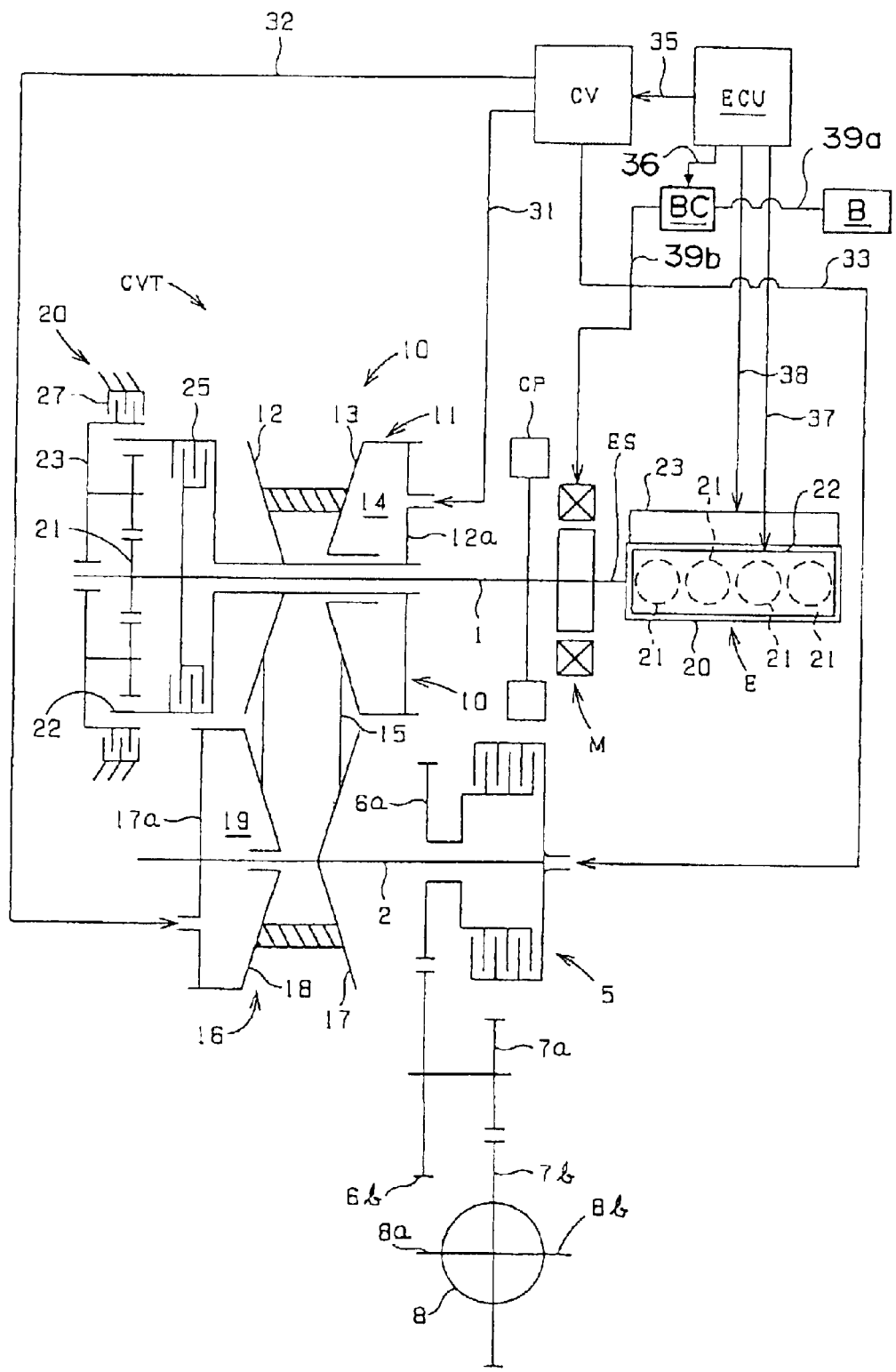
FIG. 2 is a schematic diagram describing the power transmission system of the power transmission.
Figure 3:
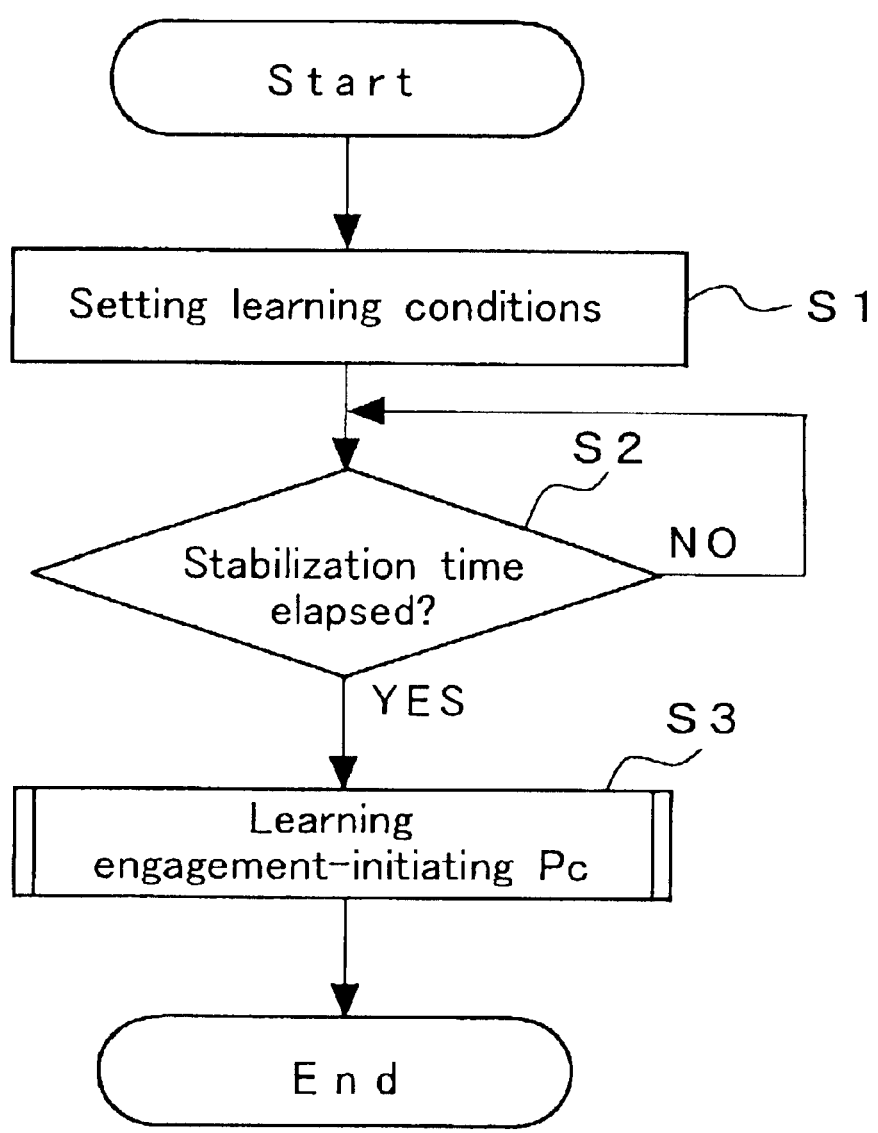
FIG. 3 is a flowchart describing a control method for learning an initial control pressure, according to the present invention.

A preferred embodiment according to the present invention is described in reference to the drawings. FIG. 1 is a sectional view describing the construction of a power transmission used for a vehicle, which power transmission incorporates a frictionally engaging element (friction clutch) controlled by a control method according to the present invention. FIG. 2 shows schematically the power transmission system of this power transmission. It is clear from these drawings that this power transmission comprises an engine E, an electrical motor generator M, which is connected to the output shaft Es of the engine E, and a continuously variable transmission CVT, which is connected through a coupling mechanism CP to the output shaft Es of the engine.

The engine E is a four cylinder reciprocating engine and has a piston in each of the four cylinder bores 21 formed in a cylinder block 20. The engine E is also equipped with a suction and exhaust controller 22, which controls the operation of the suction valves and the exhaust valves for each cylinder bore 21, and with a fuel injection and ignition controller 23, which controls the injection of fuel and the ignition for each cylinder bore 21.

The electrical motor generator M can assist the driving force of the engine when the electrical motor generator M is powered through power supply lines 39a and 39b by a battery B incorporated in the vehicle, and it can charge the battery B by generating electricity from the rotational drive received from the wheel side while the vehicle is in a deceleration (energy recovery). Thus, this power transmission has a hybrid-type drive source with a battery controller BC controlling these power supply control and energy recovery control (charging control).

The continuously variable transmission CVT comprises a metal V-belt mechanism 10, a forward/reverse switching mechanism 20 and a starting clutch (main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to a differential mechanism 8 and then through right and left driving axle shafts 8a and 8b to right and left wheels (not shown). In addition, a hydraulic pump P is provided in the transmission housing and is connected to the input shaft 1 through a chain mechanism CM. Therefore, the hydraulic pump P is driven by the input shaft 1, which rotates at the same rotational speed as the output shaft Es of the engine, so that oil is supplied to a control valve CV as described in detail later in this section.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the lateral outside of the movable pulley half 13, a drive-pulley cylinder chamber 14 is defined by a cylinder wall 12a, and a pulley-control pressure supplied through the control valve CV and through an oil passage 31 into the drive-pulley cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the lateral outside of the movable pulley half 18, a driven-pulley cylinder chamber 19 is defined by a cylinder wall 17a, and a pulley-control pressure supplied through the control valve CV and through an oil passage 32 into the driven-pulley cylinder chamber 19 generates a thrust which shifts the movable pulley half 18 in the axial direction of the driven pulley.

In this construction, the hydraulic pressures being supplied into these cylinder chambers 14 and 19 of the drive and driven pulleys, respectively, are controlled by the control valve CV to generate appropriate lateral thrusts in these two pulleys, so that there will be no slip of the belt 15. Furthermore, these pressures supplied into the cylinder chambers are controlled to create a difference between these lateral thrusts, so that the groove widths of these pulleys will change to adjust the pitch radii of the respective pulleys for the V belt 15. In this way, the speed change ratio of the transmission is controlled to vary continuously without any step. These lateral thrusts, which are generated in the drive and driven pulleys for the speed change ratio control, are generated from a line pressure that is adjusted by a regulator valve from the pressure of the hydraulic pump P, which is connected to the input shaft 1 through the chain mechanism CM. More specifically, the pressure of either the drive or driven cylinder chamber that is the higher of the two is produced from the line pressure.

The forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when the forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction). The engagement operation of the forward clutch 25 and the reverse brake 27 is controlled with a forward/reverse control pressure that is adjusted by the control valve CV from the line pressure.

The starting clutch 5 is a clutch to control the power transmission between the countershaft 2 and the output members of the transmission, i.e., power transmission gears 6a, 6b, 7a and 7b. In the condition where the starting clutch 5 is engaged connecting the countershaft to the power transmission gears, the output of the engine, after undergoing the speed ratio change by the metal V-belt mechanism 10, is transmitted through the gears 6a, 6b, 7a and 7b to the differential mechanism 8 and then divided and transmitted by the differential mechanism 8 to the right and left axle shafts 8a and 8b and then to the right and left drive wheels. When the starting clutch 5 is released or disengaged, this power transmission is terminated, so the transmission is in neutral condition. The engagement of the starting clutch 5 is controlled with a clutch-control pressure that is adjusted by the control valve CV from the line pressure and supplied through an oil passage 33.

In this continuously variable transmission CVT, as described above, the pulley-control pressures supplied to the drive and driven pulleys from the control valve CV through the oil passages 31 and 32, respectively, are used for the speed ratio change control while the forward/reverse control pressure supplied to the forward clutch 25 and the reverse brake 27 from the control valve CV through an oil passage, (not shown) is used for the forward/reverse switching control of the transmission. In addition, the clutch-control pressure supplied from the control valve CV through the oil passage 33 is used for the starting clutch engagement control. For controlling these control pressures, the operation of the control valve CV, which receives oil from the hydraulic pump P, is controlled by means of control signals sent from an electrical control unit ECU.

In a condition where either the forward clutch 25 or the reverse brake 27 is engaged, the transmission of the rotational driving forces of the engine E and the electrical motor generator M to the drive wheels can be controlled by controlling the engaging action of the starting clutch 5. Conversely, in a condition where the starting clutch 5 is engaged, either the forward clutch 25 or the reverse brake 27 can be controlled to transmit the driving forces, achieving the same effect. It should be noted from this reversible point of view that the starting clutch 5, the forward clutch 25 and the reverse brake 27 correspond to the term "frictionally engaging element" defined in the "WHAT IS CLAIMED IS:" section.

In the vehicle incorporating this transmission, the electrical motor generator M assists the driving force of the engine E, so that the engine E can operate in a range which is most fuel efficient. To further improve the fuel efficiency of the vehicle, the electrical motor generator M generates electricity to recover energy exploiting a rotational force received from the drive wheels during the deceleration of the vehicle. Especially while the brake is being operated to restrict the drive wheels during the deceleration, the electrical motor generator M functions to recover a large amount of energy. Simultaneously, it assists the braking force by applying the torque of the energy recovery as a decelerating torque. The operation of the electrical motor generator M for these driving assistance and energy recovery is controlled by the battery controller BC, which receives control signals sent from the electrical control unit ECU through a control line 36. In tandem with the operational control of the electrical motor generator M, the speed ratio change control is performed to achieve an optimal speed change ratio for the transmission, so that the engine E can operate in a most fuel efficient range. This control is also executed by means of control signals sent from the electrical control unit ECU through a control line 35 to the control valve CV.

Furthermore, the engine E can be operated in a partial cylinder operation mode where some of the four cylinders are set in a stand-by condition when a predetermined condition is satisfied for the vehicle (for example, in a deceleration). More specifically, while the electrical control unit ECU controls the operation of the suction and exhaust controller 22 with control signals sent through a control line 37 and the operation of the fuel injection and ignition controller 23 through a control line 38, to operate the engine in a partial cylinder operation mode, it keeps suction and exhaust valves being closed for some or all the cylinder bores 21 and inhibits these cylinders from receiving fuel injection and ignition. By operating the engine in this way, the fuel efficiency of the vehicle is improved especially during the vehicle's deceleration. In addition, the force of engine brake is made relatively small, so that the energy spent for the deceleration is recovered effectively by the electrical motor generator M.

In this power transmission, for the transmission of the rotational output of the engine E to the drive wheels, the transmission capacity of the starting clutch 5 is controlled to start the vehicle. Therefore, it is important to determine accurately the engagement-control pressure at which the starting clutch 5 starts an engagement. This control pressure determination is performed at the end of a manufacturing line of the vehicle before the shipment from a factory. Now, a learning control method used for measuring the engagement-control pressure is described in the following.

In this learning control, various conditions for a learning are set at Step S1. In this measurement, for example, while the operational condition of the engine is kept constant, the control pressure Pc of the starting clutch 5 is changed in a sweep. Therefore, at first, the engine is set in a constant operational condition. For example, the engine is maintained at a target idling rotational speed by holding the throttle of the engine closed and by fixing the amount of by-pass air and the ignition timing constant while the transmission is set in an in-gear condition (for example, D range). In addition, the drive wheels are braked to stop and keep the vehicle stationary, and the auxiliary electrical equipment, for example, the air-conditioner, is turned off to eliminate the load of the auxiliary equipment on the engine. Also, the electrical generator is turned off or the load of the generator is kept constant.

If these conditions are not met, for example, if the air-conditioner is on, or if lamps are lit, and this condition is likely to cause a fluctuation in the electrical load, then the control flow does not proceeds to the learning control because the learning conditions are not satisfied.

After the learning conditions are set at Step S1, a timer is started to wait for the conditions to stabilize. The control flow waits for the time period set on this stabilization timer (for example, 5 seconds) to elapse at Step S2. When the time to wait for stabilization set on the timer elapses, as the rotational speed Ne and the suction or negative pressure Pb stabilize, from this point in time at Step S3, the learning control is performed for an engagement-initiating control pressure or an initial control pressure.

Figure 4:
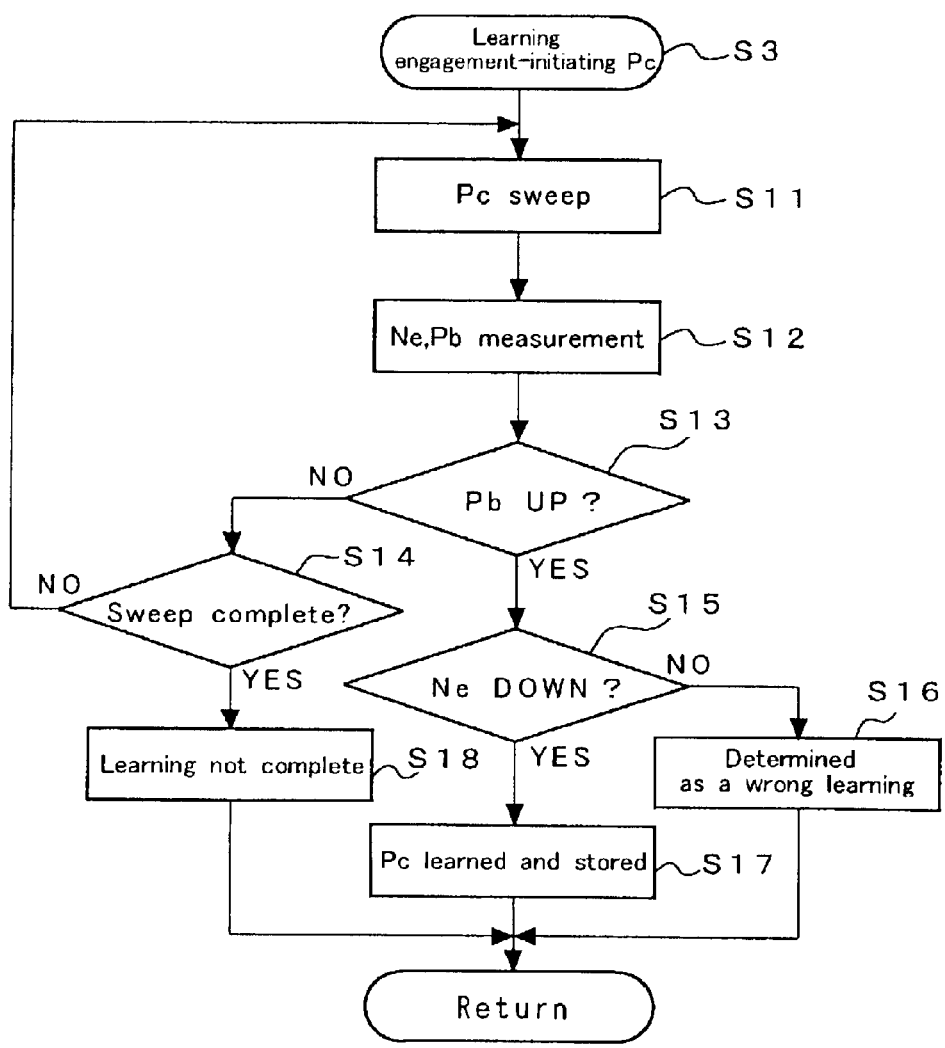
FIG. 4 is a flowchart showing control steps of a learning control for a pressure that initiates the engagement in the control shown in FIG. 3.

The steps of the learning control are shown in FIG. 4. At these steps, at first, the control-pressure command value PCMD of the starting clutch 5 is increased gradually from a predetermined low pressure (a low pressure, for example, 1 kgf/cm2, which sets the starting clutch 5 in disengagement) to a predetermined high pressure (a pressure, for example, 2 kgf/cm2, which is barely high enough for the starting clutch 5 to start an engagement operation reliably). In other words, the control-pressure command value PCMD is swept from the predetermined low pressure to the predetermined high pressure at Step S11. While it is being swept, the rotational speed Ne and the negative pressure Pb of the engine is measured or monitored at Step S12.

At Step S13, a determination is made whether this measured suction negative pressure Pb has increased by a predetermined value or not. If the suction negative pressure has not increased, then the control flow proceeds to Step S14, or if the sweeping operation has not completed, then control flow returns to Step S11. In this way, the control-pressure command value PCMD is swept continuously, and when the suction negative pressure Pb has increased by the predetermined value (i.e., the suction negative pressure has changed to a higher load side), the control flow proceeds to Step S15, where another determination is made whether the rotational speed Ne of the engine has decreased by a predetermined value or not. If the rotational speed Ne has decreased by the predetermined value, i.e., the rotational speed Ne has decreased because of the increase of the suction negative pressure Pb, then the starting clutch 5 is considered to have started an engagement operation, increasing the load of the engine. Therefore, the control-pressure command value PCMD at this moment is learned and stored as an initial control-pressure command value at Step S17. Actually, the point of time at which the suction negative pressure Pb starts to increase or the rotational speed Ne starts to decrease is the time when the clutch starts an engaging action, so a process to revise the control-pressure command value PCMD at this point as the initial control-pressure command value is performed.

On the other hand, if the rotational speed Ne of the engine does not decrease although the suction negative pressure Pb has increased, i.e., the rotational speed Ne increases or does not change much, then this phenomenon is considered to have happened from a cause other than the start of the engagement operation of the starting clutch 5. Therefore, this case is considered as a case of wrong learning at Step S16, and the control initial value in this case is not learned or stored. Such a case happens, for example, if the braking of the drive wheels is loosened during the measurement. As the brake master cylinder receives an assisting force from the suction negative pressure of the engine, when the brake is loosened, the supply of the suction negative pressure to the brake master cylinder is stopped. As a result, the suction negative pressure Pb increases, and along with this increase, the rotational speed Ne of the engine increases.

However, if the operation to sweep the control-pressure command value PCMD to the predetermined high pressure completes without any increase in the suction negative pressure Pb, then the control flow proceeds from Step S14 to Step S18, where the learning is judged as incomplete. In this case, of course, the initial control value is not learned or stored.

Figure 5:
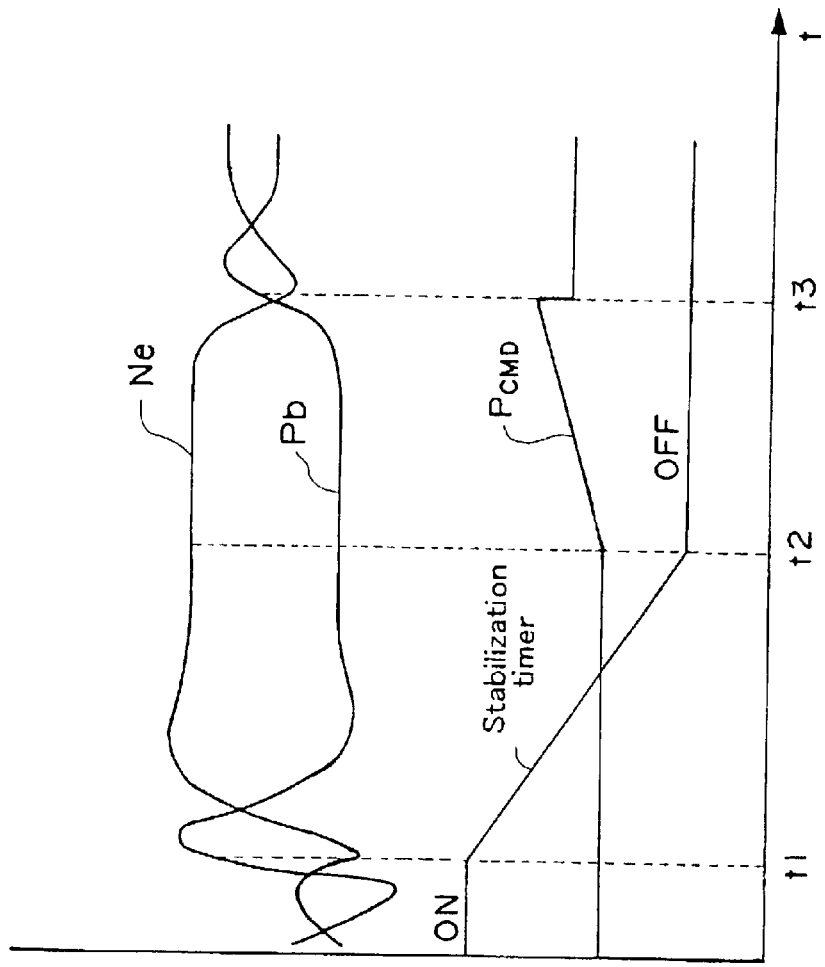
FIG. 5 is a time diagram showing chronological changes observed in various parameters while the learning control is performed normally.
Figure 6:
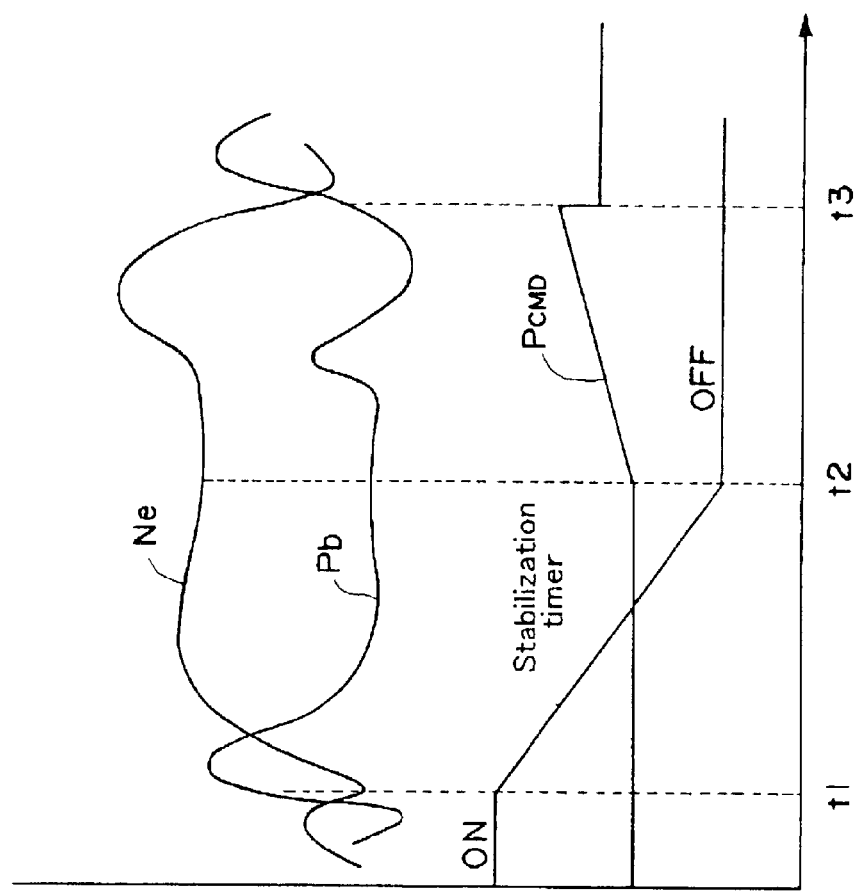
FIG. 6 is a time diagram showing chronological changes observed in various parameters while the learning control is performed abnormally.
Figure 7:
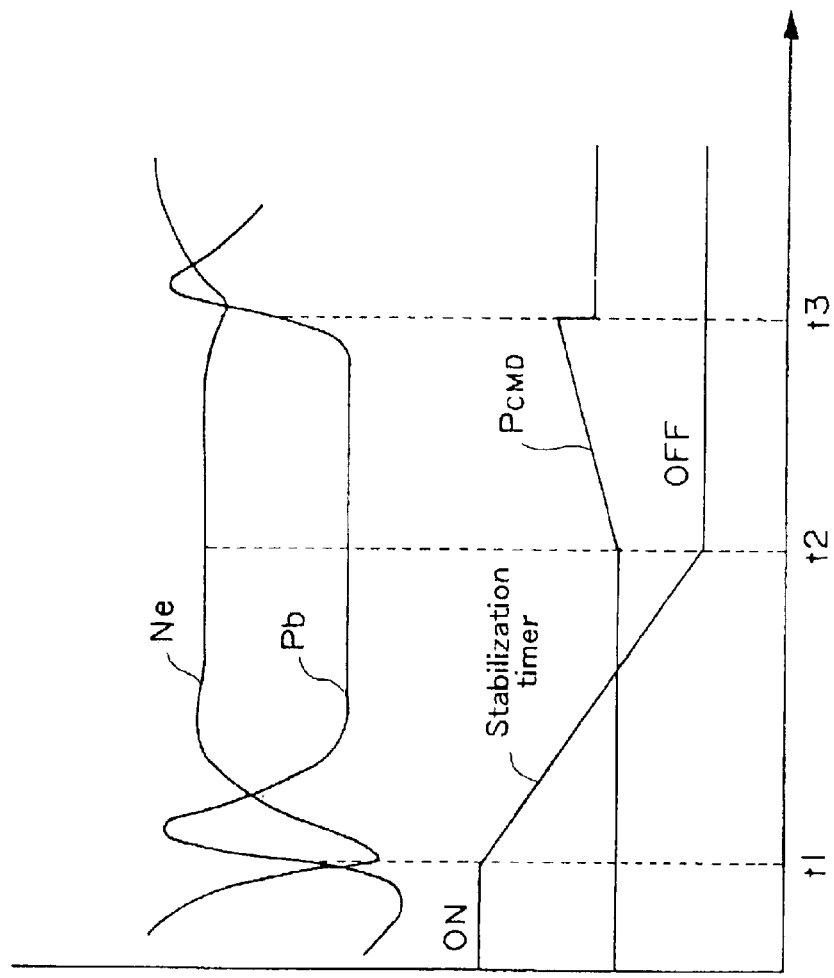
FIG. 7 is a time diagram showing chronological changes observed in various parameters while the learning control is performed abnormally.

As examples, specific cases where engagement-initiating control pressures are learned in the above described way are now described in reference to FIG. 5~FIG. 7, whose time diagrams show chronological changes observed in the engine rotational speed Ne, the stabilization timer and the control-pressure command value PCMD.

FIG. 5 shows a case where the learning control is performed normally. Here, the learning conditions have set at time t1, and from this point in time, the stabilization timer starts operation. While the learning conditions set are maintained, the control-pressure command value PCMD of the starting clutch 5 is also maintained at the predetermined low pressure, so that the starting clutch 5 is kept in a disengaged condition. This condition functions to stabilize the rotational speed Ne and the suction negative pressure Pb of the engine, and when the time set on the stabilization timer has elapsed at time t2, these parameters of the engine substantially stabilize.

At time t2, the sweeping of the control-pressure command value PCMD is started to increase the control-pressure command value PCMD gradually from the predetermined low pressure (for example, 1 kgf/cm2) to the predetermined high pressure (for example, 2 kgf/cm2). As the control-pressure command value PCMD increases gradually, when the starting clutch 5 starts engaging, the driving load of the engine increases. As a result, the suction negative pressure Pb increases while the rotational speed Ne of the engine decreases. When these changes are detected at time t3, the control-pressure command value PCMD at the moment is learned and stored as the initial control-pressure command value.

On the other hand, FIGS. 6 and 7 show cases where the sessions of the learning control are judged as a wrong learning. In these cases, the control flow proceeds through the same steps as the above case of normal learning until time t2, when the time set on the stabilization timer has elapsed. However, after the sweeping operation of the control-pressure command value PCMD has started at time t2, the brake is loosened. In the case shown in FIG. 6, the brake is loosened in the initial stage of the sweeping, i.e., at the point prior to the starting of the engaging action of the starting clutch 5. In this case, when the brake is loosened as described above, the suction negative pressure Pb increases (i.e., changes to the higher load side), so the rotational speed Ne of the engine increases. On the other hand, in the case shown in FIG. 7, the brake is loosened in the latter half stage of the sweeping. In this case, although the rotational speed Ne has started to decrease because of the starting of the engaging action of the starting clutch 5, the rotational speed Ne increases by the loosening of the brake. These opposing changes act to offset each other, so that the rotational speed Ne does not change much. However, the suction negative pressure Pb increases.

The initial control-pressure command value set as described above is used for the engagement control of the starting clutch 5 when the vehicle with the power transmission described above is driven for the first time on the road. Thereafter, the engagement-control command value at which the starting clutch 5 begins an engaging action is calculated from the engagement characteristics that are determined from the condition of the starting clutch 5 being controlled to engage in real situations. The engagement-control command value is calculated and used to renew the initial control-pressure command value in memory, continually. In this way, the initial control-pressure command value is always adjusted appropriately to the current engagement characteristics of the starting clutch 5, which characteristics can change, for example, as the starting clutch 5 experiences deterioration with age. This enables the engagement control of the starting clutch 5 to be performed accurately in good condition for a long time.

The above description is about the engagement-control pressure of the starting clutch 5, but it is only an example. The method according to the present invention can be applied, in the same way, to the engagement-control pressure of the forward clutch 25 or to that of the reverse brake 27. Though the above example of power transmission incorporates a metal V-belt mechanism 10, another type of continuously variable transmission or a gear-type power transmission may be also used for the method according to the present invention.

As described above, according to the present invention, while the operational condition of the engine is kept constant, only the engaging condition of a frictionally engaging element is changed to measure an initial control value at which the engaging action of the frictionally engaging element starts. This measurement can be performed simply and quickly (in about 10 seconds). For example, it can be performed simply at the end of a manufacturing line before the vehicle is shipped from a factory, without complicating a pre-shipment inspection. If the initial control value is set by the measurement in the pre-shipment condition in this way, then this condition enables the vehicle equipped with an idling elimination control to perform the idling elimination control without any problem immediately after the delivery of the vehicle, so it increases the product value.

This initial control value set beforehand is used for the engagement control of the frictionally engaging element when the power transmission is operated for the first time in a real situation. Thereafter, the engagement-control value at which the frictionally engaging element begins an engaging action is calculated from the engagement characteristic determined from the condition of the frictionally engaging element being controlled to engage in real situations. Preferably, the engagement-control value is calculated and used to renew the initial control value in memory, continually. In this way, the engagement control can be performed appropriately and accurately in correspondence to the real condition even if the frictionally engaging element undergoes deterioration with age.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling engagement of a frictionally engaging element in a power transmission, through which engagement control of said frictionally engaging element, rotational output of an engine is adjusted and transmitted to drive wheels, comprising:

measuring or a parameter which corresponds to the rotational speed of said engine while said frictionally engaging element is being actuated from a disengaged condition to an engaged condition, with said engine being operated under a constant operational condition;

calculating an engagement-control value for said frictionally engaging element when there is a change in said parameter, which corresponds to the rotational speed of said engine, being measured;

storing said calculated engagement-control value as an initial control value for starting an engaging action of said frictionally engaging element; and using said initial control value to control the engagement of said frictionally engaging element, wherein said parameter is a suction negative pressure of said engine; and wherein, when the suction negative pressure of said engine changes to a higher load side and when the rotational speed of said engine decreases, said engagement-control value for said frictionally engaging element is stored as said initial control value.

2. The method as set forth in claim 1, wherein:

said frictionally engaging element comprises a starting clutch; and said engagement-control value is an engagement-control pressure supplied to said starting clutch.

3. The method as set forth in claim 2, wherein:

said parameter, which corresponds to the rotational speed of said engine, is measured while the engagement-control pressure supplied to said starting clutch is being swept from a predetermined low pressure to a predetermined high pressure, with said engine being operated under said constant operational condition.

4. The method as set forth in claim 1, wherein:

said initial control value is used for controlling the engagement of said frictionally engaging element when said power transmission is operated for first time;

thereafter, an engagement-control value at which said frictionally engaging element begins an engaging action is calculated from an engagement characteristic determined from the condition of said frictionally engaging element being controlled to engage in a real situation; and the engagement-control value calculated is used as a new initial control value to renew said initial control value in memory.

5. The method as set forth in claim 1, wherein:

and although the suction negative pressure of said engine changes to a higher load side, if the rotational speed of said engine increases or does not change, then this condition is judged as a case of wrong learning, so the engagement-control value for said frictionally engaging element in this case is not stored as said initial control value.

6. The method as set forth in claim 1, wherein:

said constant operational condition includes conditions where said engine is maintained at a target idling rotational speed by a throttle of said engine being held closed, by an amount of by-pass air being set constant and by an ignition timing being maintained constant, where said transmission is set in an in-gear condition while drive wheels are braked to stop and keep a vehicle stationary, where auxiliary equipment such as an air-conditioner is turned off to eliminate a load of the auxiliary equipment, and where an electrical generator is turned off.

* * * * *